United States Patent
Day et al.

(10) Patent No.: US 7,493,304 B2
(45) Date of Patent: Feb. 17, 2009

(54) ADJUSTING AN AMOUNT OF DATA LOGGED FOR A QUERY BASED ON A CHANGE TO AN ACCESS PLAN

(75) Inventors: Paul Reuben Day, Rochester, MN (US); Brian Robert Muras, Rochester, MN (US); Anne Marie Ryg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/988,354

(22) Filed: Nov. 12, 2004

(65) Prior Publication Data
US 2006/0106786 A1 May 18, 2006

(51) Int. Cl.
*G06F 7/00* (2006.01)
(52) U.S. Cl. .................. 707/2; 707/3; 707/102
(58) Field of Classification Search ............. 707/2, 707/3, 102
See application file for complete search history.

(56) References Cited

U.S. PATENT DOCUMENTS

| | | | | |
|---|---|---|---|---|
| 5,857,188 A | * | 1/1999 | Douglas | 707/9 |
| 6,092,099 A | * | 7/2000 | Irie et al. | 709/202 |
| 7,127,456 B1 | * | 10/2006 | Brown et al. | 707/3 |
| 7,185,000 B1 | * | 2/2007 | Brown et al. | 707/3 |
| 7,194,451 B2 | * | 3/2007 | Chaudhuri et al. | 707/2 |
| 2002/0198867 A1 | * | 12/2002 | Lohman et al. | 707/3 |
| 2003/0065648 A1 | * | 4/2003 | Driesch et al. | 707/2 |
| 2003/0088579 A1 | * | 5/2003 | Brown et al. | 707/104.1 |
| 2004/0049423 A1 | * | 3/2004 | Kawashima et al. | 705/14 |
| 2004/0122925 A1 | * | 6/2004 | Offermann | 709/223 |

* cited by examiner

*Primary Examiner*—Christian P. Chace
*Assistant Examiner*—Son T Hoang
(74) *Attorney, Agent, or Firm*—Owen J. Gamon

(57) ABSTRACT

In an embodiment, a problem record associated with a query is saved to a log if the query encountered a problem. The amount of data in the record is increased if an access plan associated with the query has changed within a threshold amount of time and decreased if the access plan has not changed. In various embodiments, the problem is that the query executes longer than a historical average for the query, the query executes longer than a threshold, or the query encounters a functional error. In an embodiment, a benchmark record is also saved to the log, the problem record is compared to the benchmark record, and the difference is presented. In various embodiments, an oldest record is periodically removed from the log, or an oldest record is removed from the log if the associated query has more than a threshold number of records.

3 Claims, 6 Drawing Sheets

| | | LOG | |
|---|---|---|---|
| ⌐215 | ⌐220 | ⌐225 | ⌐230 |
| QUERY ID | LOG TIME | TYPE | DATA |
| 2 | | BENCHMARK | |
| 2 | | PROBLEM | |
| | | | |

ADJUSTING AN AMOUNT OF DATA LOGGED FOR A QUERY BASED ON A CHANGE TO AN ACCESS PLAN

CROSS-REFERENCE TO RELATED APPLICATION

The present application is related to commonly-assigned patent application Ser. No. 09/970,352, to Driesch et al., filed on Oct. 3, 2001, entitled "Reduce Database Monitor Workload by Employing Predictive Query Threshold," which is herein incorporated by reference.

FIELD

This invention generally relates to computer database management systems and more specifically relates to selectively logging and comparing query information.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Fundamentally, computer systems are used for the storage, manipulation, and analysis of data, which may be anything from complicated financial information to simple baking recipes. It is no surprise, then, that the overall value or worth of a computer system depends largely upon how well the computer system stores, manipulates, and analyzes data. One mechanism for managing data is called a database management system (DBMS), which may also be called a database system or simply a database.

Many different types of databases are known, but the most common is usually called a relational database (RDB), which organizes data in tables that have rows, which represent individual entries or records in the database, and columns, which define what is stored in each entry or record. Each table has a unique name within the database and each column has a unique name within the particular table. The database also has an index, which is a data structure that informs the database management system of the location of a certain row in a table given an indexed column value, analogous to a book index informing the reader on which page a given word appears.

To be useful, the data stored in databases must be capable of being retrieved in an efficient manner. The most common way to retrieve data from a database is through statements called database queries, which may originate from user interfaces, application programs, or remote systems, such as clients or peers. A query is an expression evaluated by the database management system. As one might imagine, queries range from being very simple to very complex. Although the query requires the return of a particular data set in response, the method of query execution is typically not specified by the query. Thus, after the database management system receives a query, the database management system interprets the query and determines what internal steps are necessary to satisfy the query. These internal steps may include an identification of the table or tables specified in the query, the row or rows selected in the query, and other information such as whether to use an existing index, whether to build a temporary index, whether to use a temporary file to execute a sort, and/or the order in which the tables are to be joined together to satisfy the query.

When taken together, these internal steps are referred to as an execution plan, an access plan, or just a plan. The access plan is typically created by a software component of the database management system that is often called a query optimizer. The query optimizer may be part of the database management system or separate from, but in communication with, the database management system. When a query optimizer creates an access plan for a given query, the access plan is often saved by the database management system in the program object, e.g., the application program, that requested the query. The access plan may also be saved in an SQL (Structured Query Language) package or an access plan cache. Then, when the user or program object repeats the query, which is a common occurrence, the database management system can find and reutilize the associated saved access plan instead of undergoing the expensive and time-consuming process of recreating the access plan. Thus, reusing access plans increases the performance of queries when performed by the database management system.

Many different access plans may be created for any one query, each of which returns the required data set, yet the different access plans may provide widely different performance. Thus, especially for large databases, the access plan selected by the database management system needs to provide the required data at a reasonable cost in terms of time and hardware resources. Hence, the query optimizer often creates multiple prospective access plans and then chooses the best, or least expensive one, to execute.

Because of the performance sensitivity of queries and access plans, the database management system must provide a process to track or capture the database activity that is taking place in the system, in order to allow for later analysis and remedy of performance problems. Such processes are known as "monitors." Monitored data can include, but are not limited to, information related to execution of the queries against the database. All of the information captured via these monitors may be stored in either a log file or in another storage medium that allows for easy access to the data to perform any appropriate analysis. The results of these monitors may be then analyzed to determine if the system is operating in an optimal manner. Queries that are not making the best use of the system resources can be identified for further analysis or tuning.

Monitors can capture their information in many ways. For example, the monitor may capture information while the query is active (called runtime monitoring) or may perform its capture from a separate process and extract the information about a query from its access plan. Both of these methods require that the system expend resources formulating the information into a form that can be easily extracted and stored. On a system with a large database with frequent and complicated queries, these resources can quickly become excessive and degrade the overall performance of the system. In addition to the aforementioned problem of resources utilized in collecting the monitored information, the sheer volume of information collected also can make analysis difficult and time consuming.

Various techniques have been tried to lessen the amount of information collected, in order to attempt both easing performance degradation and making analysis easier. For example, the amount of stored information can be adjusted, such as not logging duplicate records about an identical query, in order to prevent information about each occurrence of the identical query from being added to the log file. Further, the storage medium of the system itself can be manipulated to optimize access to the log file to take advantage of any inherent strengths of the I/O (Input/Output) system to speed writes into the log file.

Unfortunately, even with the aforementioned techniques, customers frequently find themselves reading through a large amount of logged information in an attempt to determine the source of performance degradation of a query. For example, customers commonly change a setting or configuration of their database, which is then forgotten, but which results in performance degradation. The customers may then experience great difficulty in attempting to read the logged information to determine the source of the problem.

Thus, there is a need for a technique configured to reduce the overhead associated with maintaining log information and extracting log information regarding queries in a database environment.

SUMMARY

A method, apparatus, system, and signal-bearing medium are provided that, in an embodiment, save a problem record associated with a query to a log if the query encountered a problem. The amount of data in the record is increased if an access plan associated with the query has changed within a threshold amount of time and decreased if the access plan has not changed. In various embodiments, the problem may be that the query executes longer than a historical average for the query, the query executes longer than a threshold, or the query encounters a functional error. In an embodiment, a benchmark record associated with the query is also saved to the log, the problem record is compared to the benchmark record, and the difference is presented. In various embodiments, an oldest record is periodically removed from the log, or an oldest record is removed from the log if the associated query has more than a threshold number of records in the log. In this way, the amount of data in the log may be reduced and determining the source of query performance problems may be more easily determined.

BRIEF DESCRIPTION OF THE DRAWINGS

Various embodiments of the present invention are hereinafter described in conjunction with the appended drawings:

FIG. 2 depicts a block diagram of a log, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In various embodiments, an on-demand database monitor saves a problem record associated with a database query to a log if the query encountered a problem. The on-demand database monitor adjusts the amount of data in the problem record based on an access plan for the query. If the access plan associated with the query has changed within a threshold amount of time, the on-demand database monitor increases the amount of data stored in the record and decreases the amount of data if the access plan has not changed within the threshold amount of time. In various embodiments, the problem may be that the query executes longer than a historical average for the query, the query executes longer than a threshold, or the query encounters a functional error. If benchmarking is enabled, the on-demand database monitor saves a benchmark record associated with the query to the log. The on-demand database monitor may then compare the problem record to the benchmark record and present the difference between the records. In various embodiments, the on-demand database monitor periodically removes the oldest record from the log or removes the oldest record from the log if the associated query has more than a threshold number of records in the log.

Figure 1:
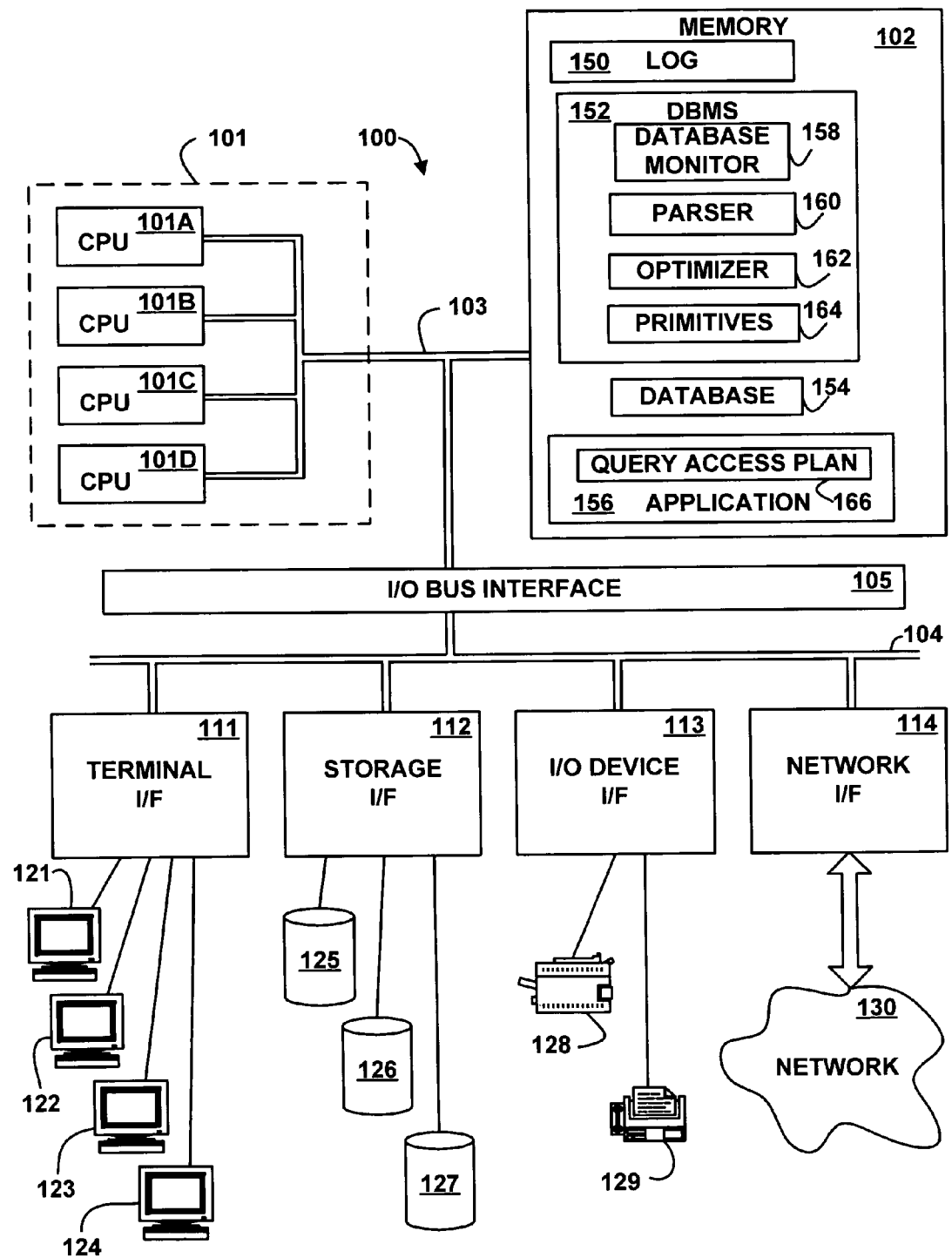
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a log 150, a database management system 152, a database 154, and an application 156.

Although the log 150, the database management system 152, the database 154, and the application 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the log 150, the database management system 152, the database 154, and the application 156 are illustrated as being contained within the main memory 102, these elements are not necessarily all completely contained in the same storage device at the same time. Further, although the log 150, the database management system 152, the database 154, and the application 156 are illustrated as being separate entities, in other embodiments some of them, or portions of some of them, may be packaged together.

The database management system 152 includes an on-demand database monitor 158, a parser 160, a query optimizer 162, and primitives 164. The parser 160, the query optimizer 162, and the primitives 164 may be implemented using the DB2 (Database 2) product available from International Business Machines of Armonk, N.Y., but in other embodiments any appropriate parser, query optimizer, and primitives may be used. The database 154 includes data, e.g., organized in rows and columns, and indexes used to access the data. The application 156 includes a query access plan 166. In another embodiment, the query access plan 166 may be separate from the application 156, including being part of or managed by the database management system 152.

The application 156 sends a query to the database management system 152. In an embodiment, a query includes a combination of SQL (Structured Query Language) commands intended to produce one or more output data tables according to a specification included in the query, but in other embodiments any appropriate query language may be used.

The parser 160 verifies the syntax of the received query and parses the received query to produce a query tree or other parsed code. The query optimizer 162 accepts the query tree or parsed code as input and, in response, creates the query access plan 166, which in an embodiment may be reused during subsequent executions of the query. The query optimizer 162 may determine the cheapest, or most efficient, way to execute the query. To this end, the query optimizer 162 may generate multiple possible access plans and choose the best one. In doing so, the query optimizer 162 may compare the costs of competing plans, and the costs may include estimated resource requirements determined in terms of time and space. More specifically, the resource requirements may include system information, such as the location of tables and parts of tables in the database 154, the size of such tables, network node locations, system operating characteristics and statistics, estimated runtime for the query, and memory usage, among others.

The query access plan 166 includes low-level information indicating the steps that the primitives 164 are to take to execute the query against the database 154. The query access plan 166 may include, in various embodiments, an identification of the table or tables in the database 154 specified in the query, the row or rows selected in the query, and other information such as whether to use an existing index, whether to build a temporary index, whether to use a temporary file to execute a sort, and/or the order in which the tables are to be joined together to satisfy the query.

The primitives 164 execute the query against the database 154 using the query access plan 166. The on-demand database monitor 158 selectively saves data records into the log 150, prunes records from the log 150, and compares records in the log 150, as further described below with reference to FIGS. 3, 4, and 5. An example data structure for the log 150 is further described below with reference to FIG. 2.

In an embodiment, the on-demand database monitor 158 includes instructions capable of executing on the processor 101 or statements capable of being interpreted by instructions executing on the processor 101 to perform the functions as further described below with reference to FIGS. 3, 4, and 5. In another embodiment, the on-demand database monitor 158 may be implemented in microcode. In another embodiment, the on-demand database monitor 158 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 and the network 130 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for the log 150, according to an embodiment of the invention. The log 150 includes records 205 and 210, but in other embodiments any number of records with any appropriate data may be present. Each of the records 205 and 210 includes a query identifier field 215, a log time field 220, a type field 225, and a data field 230, but in other embodiments more or fewer fields may be present. The query identifier field 215 identifies the query associated with the record. The log time field 220 indicates the date and/or time at which the record was added to the log 150. The type field 225 indicates the type of the record. In the example shown, records may have types 225 indicating that the record is a problem record or the record is a benchmark record. In response to functional and performance problems, the on-demand database monitor 158 logs problem records in the log 150, as further described below with reference to FIG. 3. In response to a benchmark request, the database monitor 158 logs benchmark records in the log 150, as further described below with reference to FIG. 3. The on-demand database monitor 158 further compares the difference between problem and benchmark records in the log 150, as further described below with reference to FIG. 4.

The data field 230 includes logged data related to the query identified by the query identifier field 215. In various embodiments, the data field 230 may include query performance trace data, memory pool size and usage data, temporary storage usage data, CPU usage data, system information data, job information data (information related to the job in which the query executes), the SQL statement, the indexes used by the query, the host variable/parameter values, and the type of implementation that the query optimizer 162 was attempting to build. The on-demand database monitor 158 selectively adjusts the amount and type of data logged in the data field 230, as further described below with reference to FIG. 3.

Figure 3:
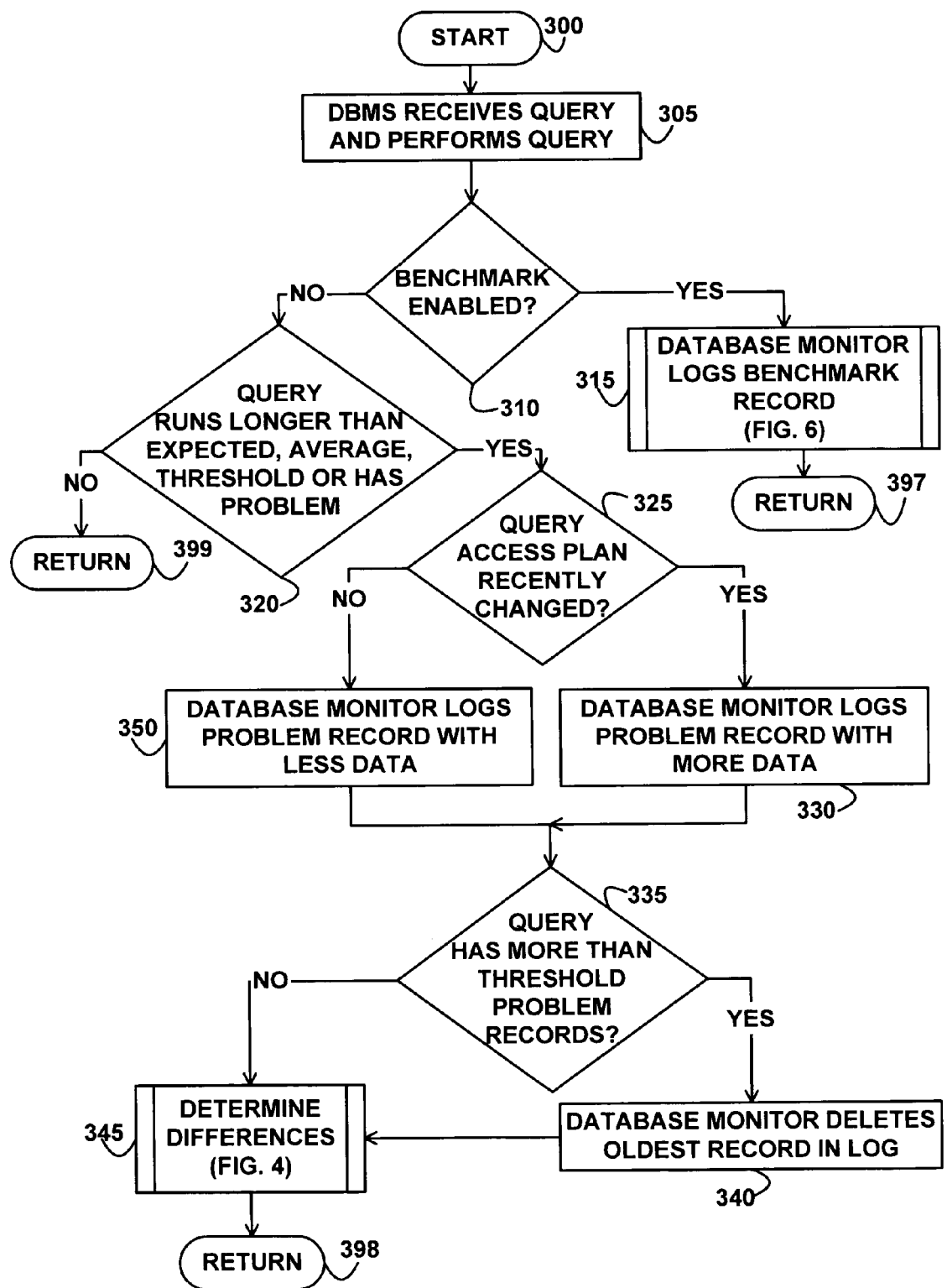
FIG. 3 depicts a flowchart of example processing for selectively logging data by an on-demand database monitor, according to an embodiment of the invention.

FIG. 3 depicts a flowchart of example processing for selectively logging data by the on-demand database monitor 158, according to an embodiment of the invention. Control begins at block 300. Control then continues to block 305 where the database management system 152 receives a query from the application 156 and performs the query against the database 154 via the parser 160, the query optimizer 162, the primitives 164, and the query access plan 166, as previously described above.

Control then continues to block 310 where the on-demand database monitor 158 determines whether a benchmark is enabled. In an embodiment, a benchmark is selectively enabled by a user, a system administrator, the application 156, or by any other appropriate mechanism at a time when the query is performing normally, optimally, or at a time when the query is desired to be used as a baseline for comparison.

If the determination at block 310 is true, then benchmarking is enabled, so control continues to block 315 where the on-demand database monitor 158 logs a benchmark record, as further described below with reference to FIG. 6. Control then continues to block 397 where the logic of FIG. 3 returns.

If the determination at block 310 is false, then a benchmark is not enabled, so control continues to block 320 where the on-demand database monitor 158 determines whether the query is running longer than an expected threshold, the query is running longer than a historical average, or the query has encountered a functional problem or error. If the determination at block 320 is true, then the query is running longer than an expected threshold, the query is running longer than a historical average, or the query has encountered a functional problem or error, so a problem record needs to be saved to the log 150, so control continues to block 325 where the on-demand database monitor 158 determines whether the query access plan 166 has been recently changed (has been changed within a threshold period of time).

If the determination at block 325 is true, then the query access plan 166 has been recently changed, so control continues to block 330 where the on-demand database monitor 158 creates a record in the log 150 with the type field 225 indicating a problem and the data field 230 containing a full complement of data. Control then continues to block 335 where the on-demand database monitor 158 determines whether the query has more than a threshold number of records having a type field 225 indicating a problem in the log 150.

If the determination at block 335 is true, then the query has more than a threshold number of records having a type field 225 indicating a problem in the log 150, so control continues to block 340 where the on-demand database monitor 158 deletes the oldest record in the log associated with the current query (found via the query identifier field 215) based on the log time field 220. Control then continues to block 345 where the on-demand database monitor 158 determines differences between the records in the log 150 for the current query, as further described below with reference to FIG. 4. Control then continues to block 398 where the logic of FIG. 3 returns.

If the determination at block 335 is false, then the query does not have more than a threshold number of records having a type field 225 indicating a problem in the log 150, so control continues to block 345, as previously described above.

If the determination at block 325 is false, then the query access plan 166 has not recently changed, so control continues to block 350 where the on-demand database monitor 158 creates a record in the log 150 with the type field 225 indicating a problem and the data field 230 containing less data than the amount of data saved at block 330. Thus, the on-demand database monitor 158 adjusts the amount of the data saved in the data field 230 based on whether the query access plan 166 has been changed within a threshold amount of time if the data needs to be logged for the query. The on-demand database monitor 158 adjusts the amount of saved data by increasing the amount of the data saved to the log 150 if the access plan 166 has been changed within the threshold amount of time and by decreasing the amount of the data saved to the log 150 if the query access plan 166 has not been changed with the threshold amount of time.

Control then continues to block 335, as previously described above.

If the determination at block 320 is false, then the query is not running longer than an expected threshold, the query is not running longer than a historical average, and the query has not encountered a functional problem or error, so control continues to block 399 where the logic of FIG. 3 returns.

Figure 4:
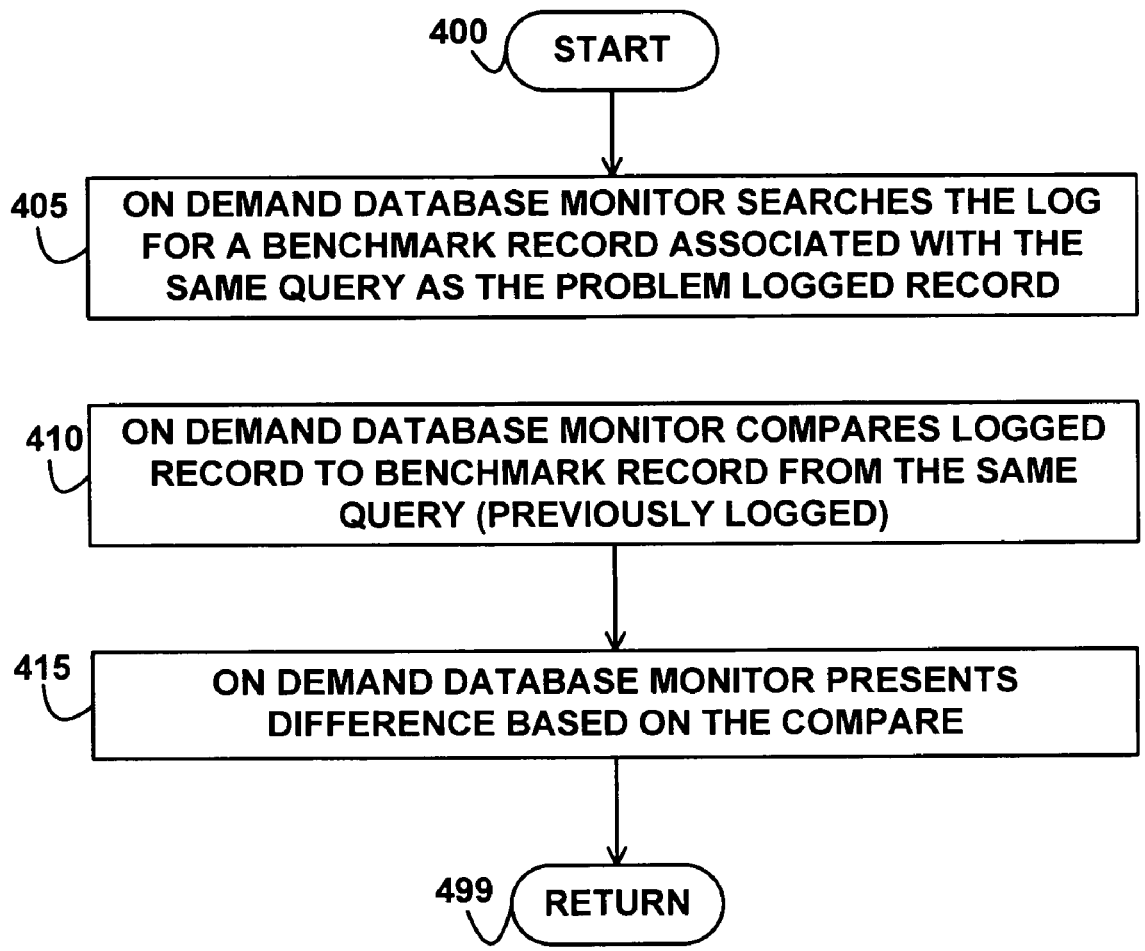
FIG. 4 depicts a flowchart of example processing for determining differences between logged records by an on-demand database monitor, according to an embodiment of the invention.

FIG. 4 depicts a flowchart of example processing for determining differences between records in the log 150 by the on-demand database monitor 158, according to an embodiment of the invention. Control begins at block 400. Control then continues to block 405 where the on-demand database monitor 158 searches the log 150 for a benchmark record (based on the type field 225) associated with the same query (based on the query identifier 215) as the problem record (based on the type field 225).

Control then continues to block 410 where the on-demand database monitor 158 compares the logged record to the found benchmark record. Control then continues to block 415 where the on-demand database monitor 158 presents the difference between the data in the data field 230 of the problem record and the benchmark record for the same query identifier 215 based on the compare. The difference may be presented via an output device, such as the user terminals 121, 122, 123, or 124 (FIG. 1). Frequently, the cause of the performance degradation is that the customer has changed a setting or configuration, but the customer has unfortunately forgotten that the change was made by the time that the performance degradation is noticed. By comparing the data field 230 in the benchmark records to the data field 230 in the problem records, the change may be detected and presented.

Figure 5:
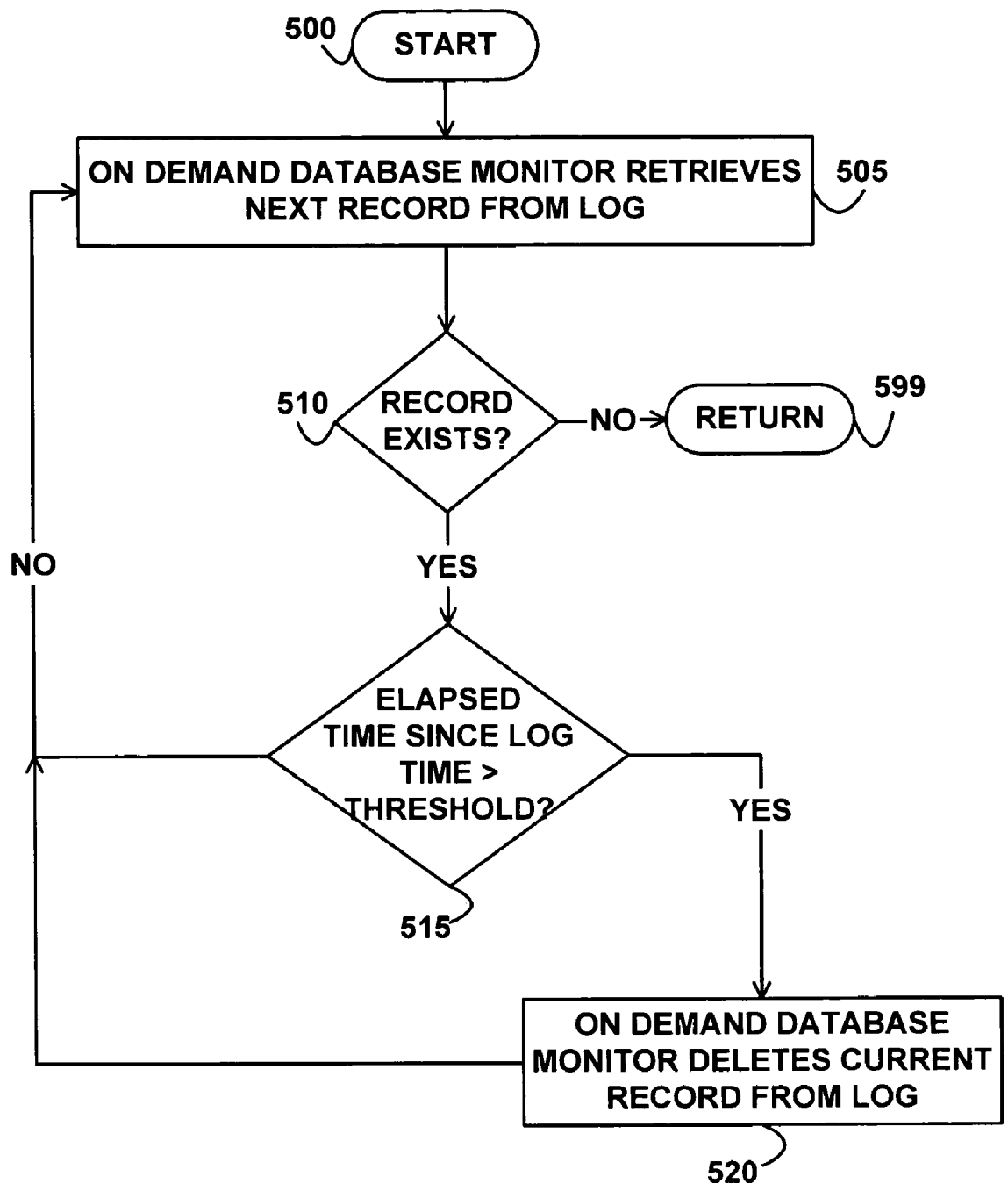
FIG. 5 depicts a flowchart of example processing for deleting records from a log by an on-demand database monitor, according to an embodiment of the invention.

FIG. 5 depicts a flowchart of example processing for deleting records from the log 150 by an on-demand database monitor 158, according to an embodiment of the invention. The logic of FIG. 5 is executed periodically.

Control begins at block 500. Control then continues to block 505 where the on-demand database monitor 158 retrieves a next record from the log 150, for example the record 205 or 210. Control then continues to block 510 where the on-demand database monitor 158 determines whether the retrieve operation of block 505 found a record.

If the determination at block 510 is true, then a current record has been retrieved from the log 150, so control continues to block 515 where the on-demand database monitor 158 determines whether the elapsed time since the log time 220 in the current record is greater than threshold.

If the determination at block 515 is true, then the elapsed time since the log time 220 in the current record is greater than a threshold, so control continues to block 520 where the on-demand database monitor 158 deletes the current record from the log 150. Control then returns to block 505, where the on-demand database monitor 158 retrieves the next record from the log 150, as previously described above.

If the determination at block 515 is false, then the elapsed time since the log time 220 in the current record is not greater than a threshold, so control returns to block 505, where the on-demand database monitor 158 retrieves the next record from the log 150, as previously described above.

If the determination at block 510 is false, then no more records unprocessed by the logic of FIG. 5 exist, so control continues to block 599 where the logic of FIG. 5 returns.

Figure 6:
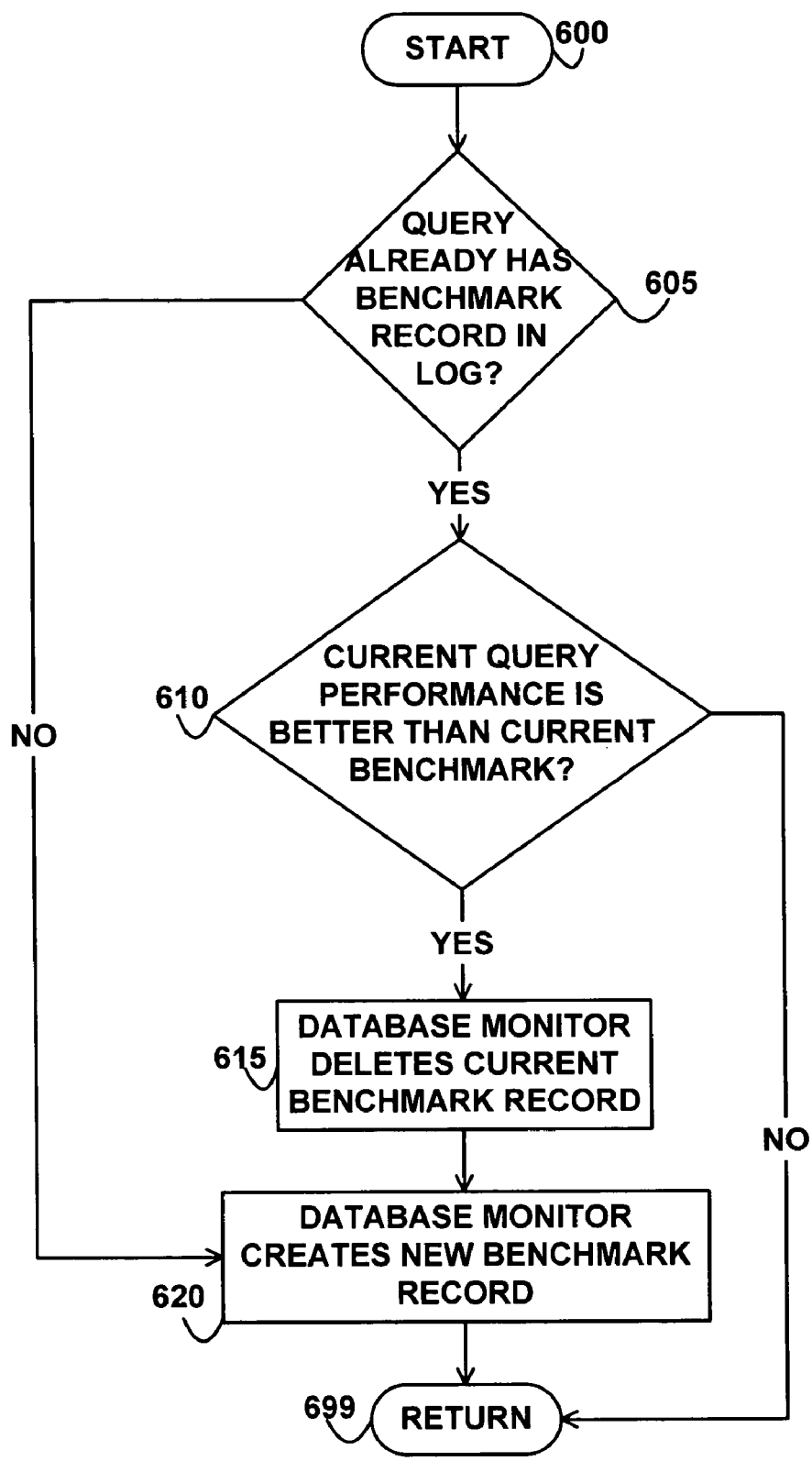
FIG. 6 depicts a flowchart of example processing for adding records to the log by the on-demand database monitor, according to an embodiment of the invention.

FIG. 6 depicts a flowchart of example processing for adding records to the log 150 by the on-demand database monitor 158, according to an embodiment of the invention. Control begins at block 600. Control then continues to block 605 where the on-demand database monitor 158 determines whether the current query already has a record in the log 150 with a type field 225 indicating a benchmark record.

If the determination at block 605 is true, then the current query already has a benchmark record in the log 150, so control continues to block 610 where the on-demand database monitor 158 determines whether the performance of the current query is superior to the performance indicated in the data field 230 of the current benchmark record in the log 150.

If the determination at block 610 is true, then the performance of the current query is superior to the performance indicated in the benchmark record, so control continues to block 615 where the on-demand database monitor 158 deletes the current benchmark record. Control then continues to block 620 where the on-demand database monitor 158 creates a new record in the log 150 with a type field 225 indicating that the record is a benchmark record and logs data in the data field 230 related to the current query. Control then continues to block 699 where the logic of FIG. 6 returns.

If the determination at block 610 is false, then the performance of the current query is not superior to the performance indicated in the data field 230 in the found benchmark record, so control continues to block 699 where the logic of FIG. 6 returns.

If the determination at block 605 is false, then the current query does not already have a benchmark record in the log 150, so control continues to block 620, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A computer-implemented method comprising:

receiving a query;

performing the query against a database based on an access plan, wherein the access plan indicates steps that primitives take to execute the query against a database;

if benchmarking is enabled, determining whether the query already has a benchmark record in a log, wherein the benchmark record comprises first performance data;

if the query already has the benchmark record in the log, determining whether second performance data associated with the performing the query indicates superior performance than the first performance data;

if the second performance data associated with the performing the query indicates superior performance than the first performance data, deleting the benchmark record from the log and adding a new benchmark record to the log, wherein the new benchmark record comprises the second performance data;

if the second performance data associated with the performing the query does not indicate superior performance than the first performance data, refraining from performing the deleting the benchmark record and the adding the new benchmark record;

if the query does not already have the benchmark record in the log, adding the new benchmark record to the log, wherein the new benchmark record comprises the second performance data associated with the performing the query;

if benchmarking is not enabled, determining whether the query runs longer than a historical average for the query;

if the query runs longer than the historical average for the query, determining whether the access plan has been changed within a threshold amount of time, if the access plan has been changed within the threshold amount of time, creating a problem record in the log and increasing an amount of data saved to the problem record;

if the access plan has not been changed within the threshold amount of time, creating the problem record in the log and decreasing the amount of the data saved to the problem record;

if the query runs longer than the historical average for the query, determining whether the query has more than a threshold number of the problem records in the log;

if the query has more than the threshold number of the problem records in the log, removing an oldest record that is associated with the query from the log;

if the query does not have more than the threshold number of the problem records in the log, finding the new benchmark record in the log, comparing the new benchmark record to the problem record, and presenting a difference based on the comparing, wherein the presenting the difference based on the comparing further comprises presenting the difference between the second performance data in the new benchmark record and the data in the problem record; and if the query does not run longer than the historical average for the query, refraining from performing the determining whether the access plan has been changed within the threshold amount of time.

2. A computer-readable storage medium encoded with computer instructions for causing a computer to execute a method comprising:

receiving a query;

performing the query against a database based on an access plan, wherein the access plan indicates steps that primitives take to execute the query against a database;

if benchmarking is enabled, determining whether the query already has a benchmark record in a log, wherein the benchmark record comprises first performance data;

if the query already has the benchmark record in the log, determining whether second performance data associated with the performing the query indicates superior performance than the first performance data;

if the second performance data associated with the performing the query indicates superior performance than the first performance data, deleting the benchmark record from the log and adding a new benchmark record to the log, wherein the new benchmark record comprises the second performance data;

if the second performance data associated with the performing the query does not indicate superior performance than the first performance data, refraining from performing the deleting the benchmark record and the adding the new benchmark record;

if the query does not already have the benchmark record in the log, adding the new benchmark record to the log, wherein the new benchmark record comprises the second performance data associated with the performing the query;

if benchmarking is not enabled, determining whether the query runs longer than a historical average for the query;

if the query runs longer than the historical average for the query, determining, whether the access plan has been changed within a threshold amount of time;

if the access plan has been changed within the threshold amount of time, creating a problem record in the log and increasing an amount of data saved to the problem record;

if the access plan has not been changed within the threshold amount of time, creating the problem record in the log and decreasing the amount of the data saved to the problem record;

if the query runs longer than the historical average for the query, determining whether the query has more than a threshold number of the problem records in the log;

if the query has more than the threshold number of the problem records in the log, removing an oldest record that is associated with the query from the log;

if the query does not have more than the threshold number of the problem records in the log, finding the new benchmark record in the log, comparing the new benchmark record to the problem record, and presenting a difference based on the comparing, wherein the presenting the difference based on the comparing further comprises presenting the difference between the second performance data in the new benchmark record and the data in the problem record; and if the query does not run longer than the historical average for the query, refraining from performing the determining whether the access plan has been changed within the threshold amount of time.

3. A computer system comprising:

a processor; and a computer-readable storage device encoded with computer instructions for causing the processor to execute a method comprising:

receiving a query;

performing the query against a database based on an access plan, wherein the access plan indicates steps that primitives take to execute the query against a database, if benchmarking is enabled, determining whether the query already has a benchmark record in a log, wherein the benchmark record comprises first performance data, if the query already has the benchmark record in the log, determining whether second performance data associated with the performing the query indicates superior performance than the first performance data, if the second performance data associated with the performing the query indicates superior performance than the first performance data, deleting the benchmark record from the log and adding a new benchmark record to the log, wherein the new benchmark record comprises the second performance data, if the second performance data associated with the performing the query does not indicate superior performance than the first performance data, refraining from performing the deleting the benchmark record and the adding the new benchmark record, if the query does not already have the benchmark record in the log, adding the new benchmark record to the log, wherein the new benchmark record comprises the second performance data associated with the performing the query, if benchmarking is not enabled, determining whether the query runs longer than a historical average for the query, if the query runs longer than the historical average for the query, determining whether the access plan has been changed within a threshold amount of time, if the access plan has been changed within the threshold amount of time, creating a problem record in the log and increasing an amount of data saved to the problem record, if the access plan has not been changed within the threshold amount of time, creating the problem record in the log and decreasing the amount of the data saved to the problem record, if the query runs longer than the historical average for the query, determining whether the query has more than a threshold number of the problem records in the log, if the query has more than the threshold number of the problem records in the log, removing an oldest record that is associated with the query from the log, if the query does not have more than the threshold number of the problem records in the log, finding the new benchmark record in the log, comparing the new benchmark record to the problem record, and presenting a difference based on the comparing, wherein the presenting the difference based on the comparing further comprises presenting the difference between the second performance data in the new benchmark record and the data in the problem record, and if the query does not run longer than the historical average for the query, refraining from performing the determining whether the access plan has been changed within the threshold amount of time.

* * * * *